(12) United States Patent
Church

(10) Patent No.: X5986
(45) Date of Patent: May 22, 1830

(54) SPINNING MACHINE

(76) Inventor: James Jr. Church

James Church Junr. Hartford Connecticut
Letters Patent, Dated May 22 1830

The Schedule referred to in these Letters Patent, and making part of the same, containing a description in the words of the said James Church Junr. himself, of his improvement in the mode of Spinning rope yarn, and yarn for cords & lines, by machinery called the Long Band Spinner.

---

To all persons to whom these presents shall come, James Church Junr. of the City of Hartford in the County of Hartford & State of Connecticut, sends Greeting. Be it known, that I the said James Church Junr. have invented, constructed, made & applied to use, a new & useful improvement in the mode of Spinning rope yarn, and yarn for cords & lines, by machinery, called the Long Band Spinner, specified in the words following, viz. This improvement (a draft of which is hereunto annexed to which reference is made for explanation) consists of (A) Band Wheel: (B) Whirls or Spindles: (C) whirl Bands: (D) Power Wheel & Shaft, connected with the band wheel by bevel gear (E): (F) Long Band, leading from the power wheel to the further end of the ropewalk round a wheel in a slide to tighten the band. The Spinner attaches himself to the long band, and moving backwards puts the machine in motion.

In testimony that the above is a true Specification of my said improvement, as above described, I have hereunto set my hand & seal, the 10th day of December 1829.

Witnesses
Henry Belden Jr.
[illegible] C. Perkins.

James Church Jr.

Recd. & Recorded, June 1842
Drawing attached.

[illegible]

(270 words)